United States Patent
Beadle et al.

(10) Patent No.: US 7,551,563 B2
(45) Date of Patent: Jun. 23, 2009

(54) ROUTING DIVERSIFIED SESSION VIA MULTIPLE NETWORK CONNECTIONS

(75) Inventors: Bruce A. Beadle, Round Rock, TX (US); Michael Wayne Brown, Georgetown, TX (US); Randolph Michael Forlenza, Austin, TX (US); Douglas Scott Rothert, Austin, TX (US); Miguel Sang, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 882 days.

(21) Appl. No.: 10/839,664

(22) Filed: May 5, 2004

(65) Prior Publication Data

US 2004/0210671 A1    Oct. 21, 2004

Related U.S. Application Data

(62) Division of application No. 09/584,068, filed on May 31, 2000, now Pat. No. 6,766,373.

(51) Int. Cl.
*G01R 31/08* (2006.01)
(52) U.S. Cl. ...................................................... 370/238
(58) Field of Classification Search ................. 370/237, 370/389, 252, 238, 238.1; 709/239, 227
See application file for complete search history.

(56) References Cited

U.S. PATENT DOCUMENTS

| | | | |
|---|---|---|---|
| 5,347,539 A | | 9/1994 | Sridhar et al. |
| 5,835,724 A | | 11/1998 | Smith |
| 5,859,959 A | | 1/1999 | Kimball et al. |
| 6,122,514 A | * | 9/2000 | Spaur et al. ................ 455/448 |
| 6,134,589 A | * | 10/2000 | Hultgren ...................... 709/227 |
| 6,145,089 A | | 11/2000 | Le et al. |
| 6,252,878 B1 | * | 6/2001 | Locklear et al. ............. 370/401 |
| 6,259,673 B1 | * | 7/2001 | Yoshihara et al. ........... 370/238 |
| 6,286,058 B1 | | 9/2001 | Hrastar et al. |
| 6,289,389 B1 | * | 9/2001 | Kikinis ........................ 709/239 |
| 6,295,294 B1 | * | 9/2001 | Odlyzko ...................... 370/389 |
| 6,324,161 B1 | | 11/2001 | Kirch |

(Continued)

OTHER PUBLICATIONS

Goyal, et al., Laboratories for Data Communications and Computer Networks, 1998 FIE Conference, 1998, pp. 1113-1118.

(Continued)

*Primary Examiner*—Kwang B Yao
*Assistant Examiner*—Candal Elpenord
(74) *Attorney, Agent, or Firm*—Dillon & Yudell, LLP

(57) ABSTRACT

A system for routing different data types along different client-to-network connection paths. A connection utility, at the client, monitors a data type being transmitted. When a first data type is being transmitted, the connection utility selects a most optimal (or efficient) connection route for that data type. The connection utility then assigns a next connection route for a second data type with different characteristics and/or routing requirements than the first data type. Differences in routing path that are factored into the criteria for selection include: wired versus wireless, level of security, transfer protocol, connection cost, speed, etc.

1 Claim, 10 Drawing Sheets

U.S. PATENT DOCUMENTS

| | | | |
|---|---|---|---|
| 6,385,193 B1 * | 5/2002 | Civanlar et al. | 370/352 |
| 6,401,129 B1 * | 6/2002 | Lenander | 709/238 |
| 6,490,610 B1 | 12/2002 | Rizvi et al. | |
| 6,519,224 B2 | 2/2003 | Hrastar et al. | |
| 6,687,229 B1 * | 2/2004 | Kataria et al. | 370/238 |
| 7,356,598 B1 * | 4/2008 | Giroir et al. | 709/228 |
| 2002/0118647 A1 * | 8/2002 | Maeno | 370/238.1 |

OTHER PUBLICATIONS

Network and Dial-Up Connection Types, Jun. 23, 2003, <HTTP://WWW.MICROSOFT.COM/WINDOWSXP/HOME/USING/PRODUCTDOC/EN/CONNECTION_TYPES.ASP>.

Network Connection Icons, Jun. 24, 2003, <HTTP://WWW.MICROSOFT.COM/TECHNET/PRODTECHNOL/WINDOWSSERVER2003/PRODDOCS/ENTSERVER/LAN>.

* cited by examiner

| Criteria | Default for all domains | ibmgame.com domain | Server connection A average metrics | Server connection B average metrics | Server connection A ibmgame.com domain metrics | Server connection B ibmgame.com domain metrics |
|---|---|---|---|---|---|---|
| Location | 3 | 3 | 2 | 5 | 5 | 2 |
| Latency | 4 | 1 | 4 | 5 | 5 | 1 |
| Bandwidth | 3 | 5 | 2 | 5 | 5 | 4 |
| Packet Size | 5 | 2 | 4 | 5 | 5 | 2 |
| $ cost | 2 | 4 | 1 | 5 | 5 | 4 |
| Reliability | 5 | 3 | 2 | 5 | 5 | 2 |
| Capacity | 3 | 5 | 3 | 5 | | 4 |
| ... | | | | | | |
| Relative Rating | 25/7 | 23/7 | 18/7 | 5 | 5 | 19/7 |

Fig. 6A

ROUTING DIVERSIFIED SESSION VIA MULTIPLE NETWORK CONNECTIONS

RELATED APPLICATIONS

The present application is a divisional of U.S. patent application Ser. No. 09/584,068, filed on May 31, 2000, now U.S. Pat. No. 6,766,373, and entitled "Dynamic, Seamless Switching Of A Network Session From One Connection Route To Another," the content of which is incorporated herein by reference.

BACKGROUND OF THE INVENTION

1. Technical Field

The present invention relates in general to computer networks and in particular to communications within computer networks. Still more particularly, the present invention relates to a method, system, and program for improving a client's session routing performance within a network by dynamically assigning different connection routes for different portions of the communication.

2. Description of the Related Art

Computer networks, such as the Internet, are typically based on Client/Server software architectures. These architectures provide a versatile infrastructure that supports shared access to server resources. A client is typically a requester of services, and a server is the provider of services. A single machine can be both a client and a server depending on the software configuration. A client machine is loaded with client software, while a server machine is loaded with server software. Clients can be either stand-alone computer systems (like personal computers) or "dumber" systems adapted for limited use with a network.

A generalized client-server computing network has several nodes or servers which are interconnected, either directly to each other or indirectly through one of the other servers. Based on network configuration, the connection by the client to the network may be via an Ethernet connection or token ring, etc. Other direct and/or indirect connection methods (e.g. telephone connection via remote access protocol) are also possible when a client is connected from the user's home, for example. In traditional networks, only a single connecting medium to the network is possible for each client.

The network can be a localized network or geographically dispersed network and can be further connected to other networks. Each server is essentially a stand-alone data processing (computer) system, having one or more processors, memory devices, and communications devices, that have been adapted (programmed) for providing information and/or services to individual users at another set of nodes or client workstations.

In a Local Area Network (LAN), for example, clients are usually configured to communicate via a particular server. For geographically dispersed networks, as in an intranet or Internet, a client's network communication may occur via a localized server or a server in another geographic location. The use of auto-proxy servers in a LAN system helps to improve network performance. However, only one connection route may be configured within the client at a particular time and these servers can become congested during heavy usage or traffic. Also, current client browsers (i.e., software applications for accessing and communication with the Internet) are typically configured to transmit network traffic via a specific server and once configured, remain set in that configuration until the user manually changes the settings to utilize another server. Thus, if the server connection is congested, the user may either remain on the connection or terminate the session and attempt to secure a faster connection by re-connecting to the same server. Also, if the connection is lost during a session, and/or another connection is made to complete the session, the session information is usually lost (or unrecoverable) and the user has to re-connect via the same server and start the session over.

Network input/output (I/O) performance is often a problem when using a browser in an intranet to access the World Wide Web or Internet. In most intranet cases, the client is required to use a sock server or a proxy server before a connection can be made to the Internet. In a typical intranet, there are several sock or proxy severs that may be geographically dispersed within the network. The performance of the servers varies throughout the day due to factors such as location, time of day, loading, etc. Thus, in most networks, auto-proxy servers, which filter the local intranet traffic from the external Internet traffic, are utilized to improve performance of sock servers.

To address such performance concerns, special tools or components have been developed to improve communication to servers connected to the Internet. For example, various load balancing solutions have been implemented, such as Local Director of Cisco Systems. Local Director performs load balancing and interfaces with the Internet-based client attempting to access the content servers. All traffic across the Internet to content servers is thus shielded by Local Director. U.S. Pat. No. 5,774,660 discloses a load balancer having a virtual address connected to a multi-node server. The load balancer receives all incoming Internet requests for server access, and modifies the destination address to reflect the correct server node that ultimately services the request. These solutions are all server-based and implemented on the back end of the network, i.e., the server connection to the Internet itself.

The present invention recognizes that it would be desirable to have a method, system, and program product for dynamically improving a client-to-network routing session performance. A method, system, and program product that allows a client browser to assigned specific connection routes to different data types being transmitted during network communication for improved efficiency would be a welcomed improvement. These and other benefits are provided in the present invention.

SUMMARY OF THE INVENTION

A system is disclosed for routing different data types along different client-to-network connection path. The system comprises a connection utility at the client, which monitors a data type being transmitted. When a first data type is being transmitted, the connection utility selects a most optimal (or efficient) connection route for that data type. The connection utility then assigns a next connection route for a second data type with different characteristics and/or routing requirements than the first data type. The routing of different data types along different routing paths is completed in a substantially seamless manner, and the data is re-associated at the destination point so that the sender and recipient do not require knowledge of the selection of different routes to transmit the two types of data. Differences in routing path that are factored into the criteria for selection include: wired versus wireless, level of security, transfer protocol, connection cost, speed, etc.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of an illustrative embodiment when read in conjunction with the accompanying drawings, wherein:

FIG. 6A is a block diagram of a table of connection attributes utilized in accordance with a preferred embodiment of the present invention;

DESCRIPTION OF AN ILLUSTRATIVE EMBODIMENT

The present invention is directed to a method, system, and program product implemented within a client system, which allows a browser application to automatically select an effective network route from the client system to a network during network communication. As utilized within the invention, the term "effective" refers to a better performing (if not the best performing or optimal) route, based on known or available criteria and present network conditions. The preferred embodiment is described with reference to optimal routes, but is done so merely for illustrative purposes. In particular, a software implemented application of the present invention expands the functionality of a traditional browser to permit a multiple-route connection setting (or configuration), by which the browser is not restricted to a connection via a single specific server and connection medium, but is permitted to select from among multiple servers and multiple connection media. The software implemented application is referred to herein as a connection utility. In a preferred embodiment, the invention reduces the need to manually change a network communication configuration from a particular server to another and enables the browser to have flexibility to ensure the best or most efficient connection routes possible under current loading conditions.

Figure 1:
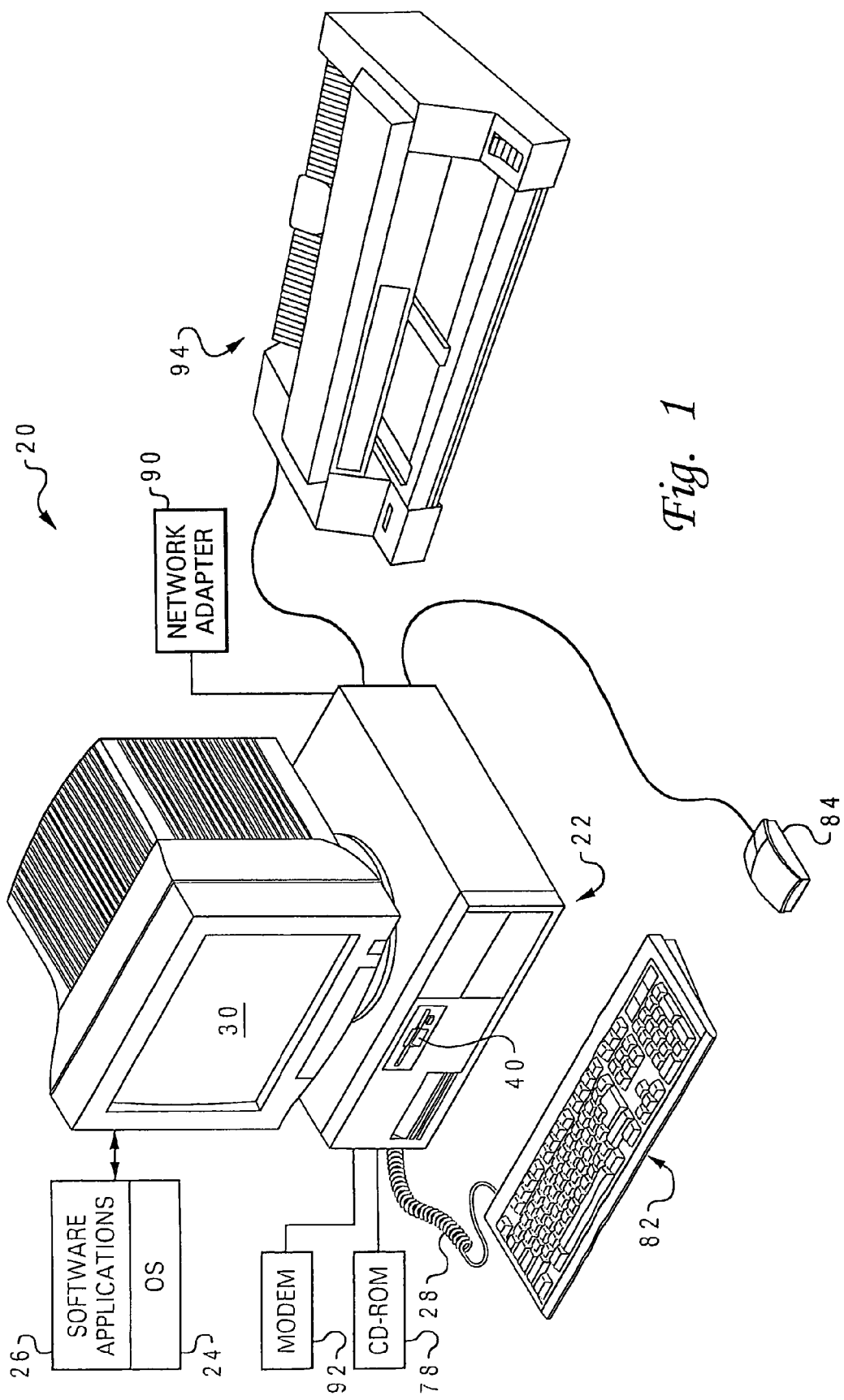
FIG. 1 depicts a data processing system, in which a preferred embodiment of the present invention may be implemented.
Figure 2:
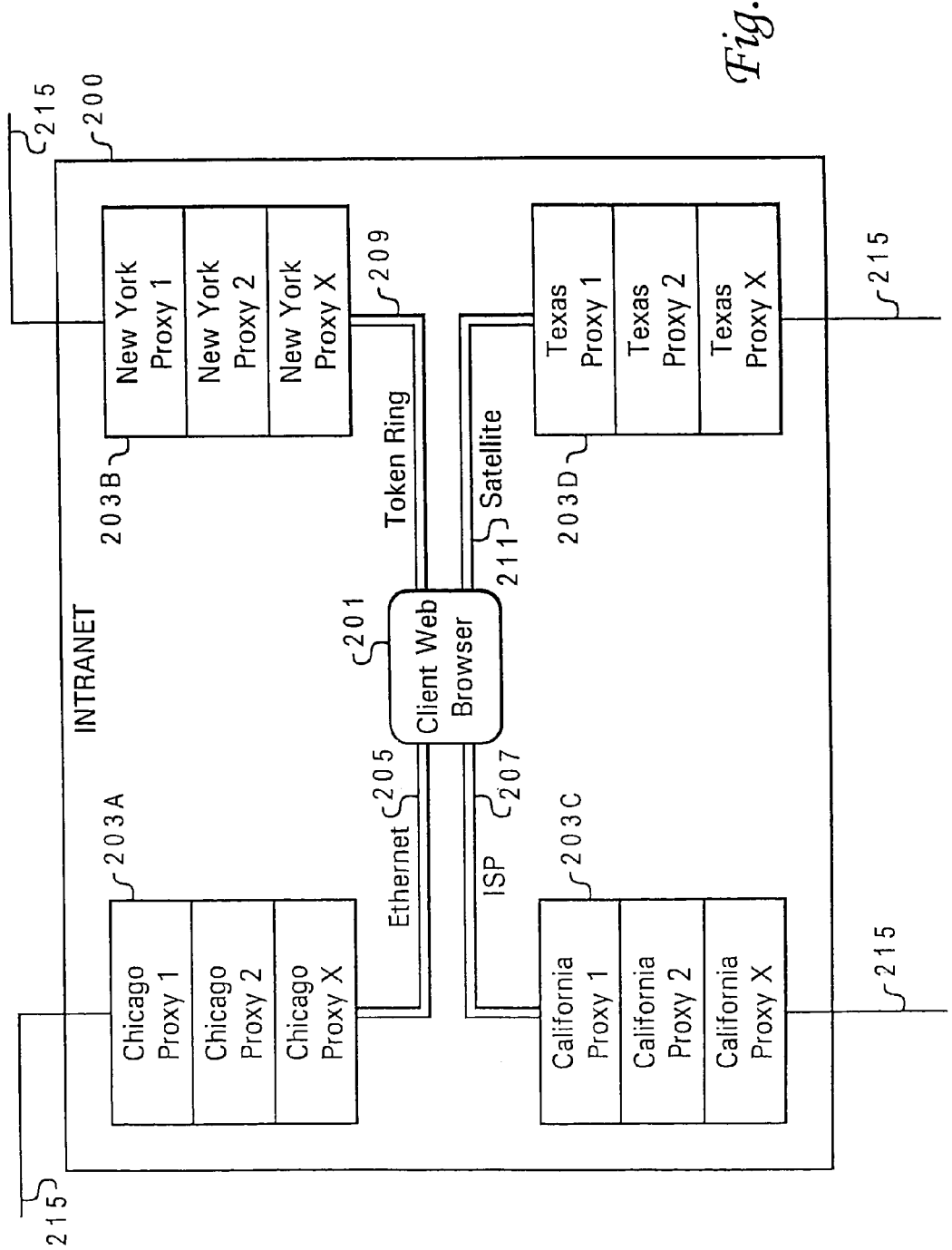
FIG. 2 is a high-level block diagram of a client browser within an intranet configuration in accordance with one embodiment of the present invention.
Figure 3:
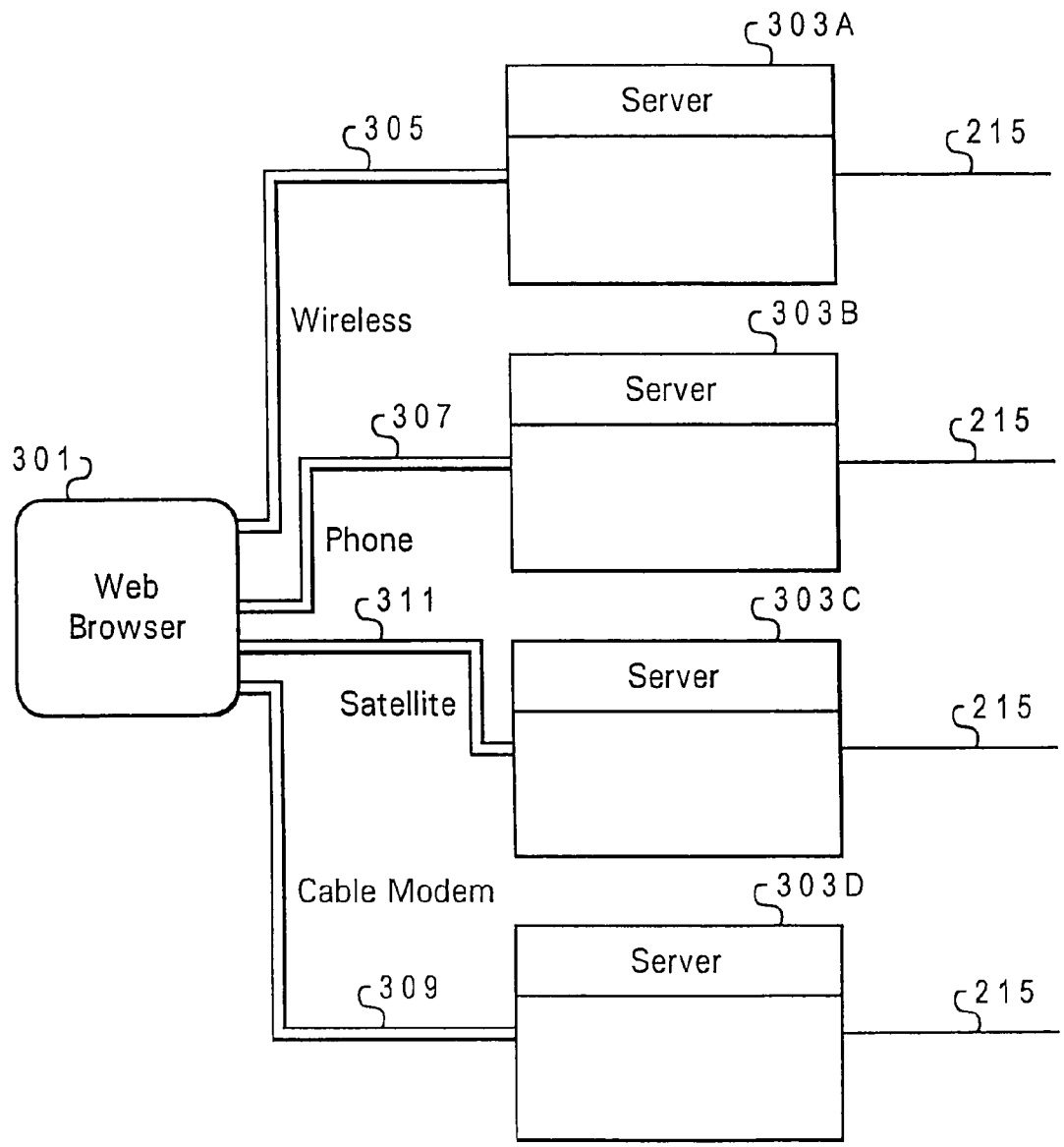
FIG. 3 illustrates a browser-network configuration with multiple selectable server-connecting media and/or routes in accordance with a preferred embodiment of the present invention.

The invention is implemented in the data processing system and network environment as illustrated in FIGS. 1 and 2 and 3, respectively. The invention may, however, be implemented in other types of data processing systems and networks, so, while the present invention may be described with references to these figures, these references should not be construed in a limiting sense.

For the purposes of this invention, the term client is utilized to refer to both the hardware component which is connected to a network server and the software applications stored in memory and being run on the hardware component. Also, the term client is utilized to mean both a directly connected network computer system and a stand-alone computer system, such as a user's home-based computer system. In the preferred embodiment, a client is provided with browser application and connection utility for accessing the Internet via several possible connection routes. User refers primarily to an individual who utilizes the client. Further, the invention applies to connections to servers of both an intranet and Internet via the browser application running on the client.

The servers of the network are typically data processing systems having a database, operating system (OS), and server software. The server software operates within a network server and provides the support for Internet access by clients.

With reference now to the figures and in particular with reference to FIG. 1, a computer system that may be utilized as a standalone computer system or one of the client or servers on a network is presented. Computer system 20 comprises a Central Processing Unit (CPU) housed in a system unit 22. System unit 22 also provides connections for various hardware components including disk drives 40 and memory devices (not shown). Several Peripheral input/output devices are connected to the CPU. These input/output devices include keyboard 82, mouse 84, printer 94, CD ROM 78, and display monitor 30.

Also coupled to CPU are various external devices, including modem 92, and network adapter 90, utilized for connecting data processing system 20 to other systems and/or networks, as is illustrated in FIGS. 2 and 3. CD Rom 78, modem 92, and network adapter 90 are depicted as external components; however those skilled in the arts are familiar with the various architectures of data processing systems and understand that these components may be housed inside of system unit 22.

Modem 92 is a communication device that enables computer system 20 to transmit information over standard telephone lines or wireless connections such as cellular. Modem 92 converts digital computer signals to interlock signals suitable for communications over these telephone media. Modem 92 can be utilized to connect data processing system 20 to a server via remote access protocols. Modem 92 may also provide a connection to other sources, such as an electronic bulletin board (BBS) or the World Wide Web (Internet). Network adapter 90 may be used to connect data processing system 20 to a network such as an intranet as depicted in FIG. 2.

Computer system 20 also preferably includes an interface such as a graphical user interface (GUI provided by an operating system (OS) 24 that resides within machine readable media to direct the operation of computer system 20. Any suitable machine-readable media may retain the OS, such as RAM, ROM, SCSI disk drive, and other disk and/or tape drive (e.g. magnetic diskette, magnetic tape, CD-ROM, optical disk, or other suitable storage media). Also, any suitable OS 24 may direct the CPU of the data processing system 20.

Further, computer system 20 preferably includes at least one software application (program product) 26 that resides within machine readable media. The software application maybe accessible by OS 24, or may be incorporated into an OS control program. Preferably, software application 26 contains instructions that when executed on the CPU carry out the particular operations of the present invention as described herein.

Selecting Browser-Network Connection

Referring now to FIG. 2, a high-level block diagram of an intranet with multiple server connections for a single client is illustrated in accordance with a preferred embodiment of the present invention. Intranet 200 comprises a plurality of servers that are at different geographical locations. These servers include Chicago servers 203A, New York servers 203B, California servers 203C, and Texas servers 203D. Client browser 201 connects to each server via a different connection medium. Thus, client browser 201 is connected via ethernet 205 to Chicago servers 203A, via Token Ring 209 to New York servers 203B, via an internet Service Provider (ISP) to California servers 203C, and via Satellite 211 to Texas servers 203D. In a preferred embodiment, the ability of a client to connect to different servers using different connecting medium is a major consideration utilized in selecting optimal routes as will be described below. The invention, however also finds applicability in a network in which each server is connected to the client via the same connecting medium. Intranet 200 connects to Internet (not shown) via network Internet connectors 215. Client browser access to the Internet is routed through the Intranet servers 203A-203D, which in effect serve as proxy servers.

The preferred embodiment of the present invention places the capability to choose the best performing network route in the client (i.e., away from the server) and specifically within the browser or other network access application running on the client. The invention assists in solving the congestion problems within an Intranet and/or the Internet. The invention also involves the encoding of software call-backs into the protocol stack and executing of a software application that utilizes the call-back utility to assist in choosing a better performing network route. The invention has greatest applicability in an intranet and/or Internet environment, but may also apply to basic LANs or other types of multiple-server networks.

For the purposes of the invention, use of the term network is understood to refer to both Wide Area Networks such as the Internet and to Local Area Networks (LAN) such as an intranet. The network types may provide different access methods but are essentially similar in their functionality, as those skilled in the art are aware. A network preferably consist of a number of servers and provides network clients with a common protocol for communicating and transferring software and information electronically within the network environment.

Turning now to FIG. 3, there is illustrated another network configuration including a client browser coupled to multiple servers. The illustrated network may represent an intranet configuration as in FIG. 2 or a stand alone client configuration. The intranet configuration shows a client, connects to a server of the intranet. The intranet server is then utilized to provide access to Internet servers. In the stand alone client configuration, a client connects directly to a server of the Internet (i.e., without the intranet server). As an Intranet configuration, the elements of FIG. 3 are similar to the elements of FIG. 2, but client may be connected utilizing remote access (e.g., access from a user's home). However, in a stand-alone client configuration, browser 301 is not coupled to an Intranet. Servers 303A-303D maybe servers of different Internet Service Providers (ISPs), which are connected to browser 301 via different connection media. Thus, browser 301 is connected to server 303A via a DSL connection 305, to server 303B via a wireless phone connection 307, to server 303C via a satellite connection 311 and to server 303D via a cable modem connection 309. ISP servers 303A-303D connect to the Internet (not shown) via ISP-Internet connectors 215.

The implementation of multiple connection media for a single client is further enhanced by permitting a user to optionally select to utilize a particular routing medium based on the desired speed of connection. Thus a satellite connection may be selected for huge data transfer, while a DSL or phone modem connection is utilized for email correspondence. The selection of a particular medium becomes even more important when each medium has a corresponding cost factor, which directly affects the user's determination of use. In another embodiment, a single server may be accessible to the client browser using one of multiple connecting media. Thus for example, servers 303A-303D may represent a single server having four ports that are each associated with a particular medium.

Figure 4:
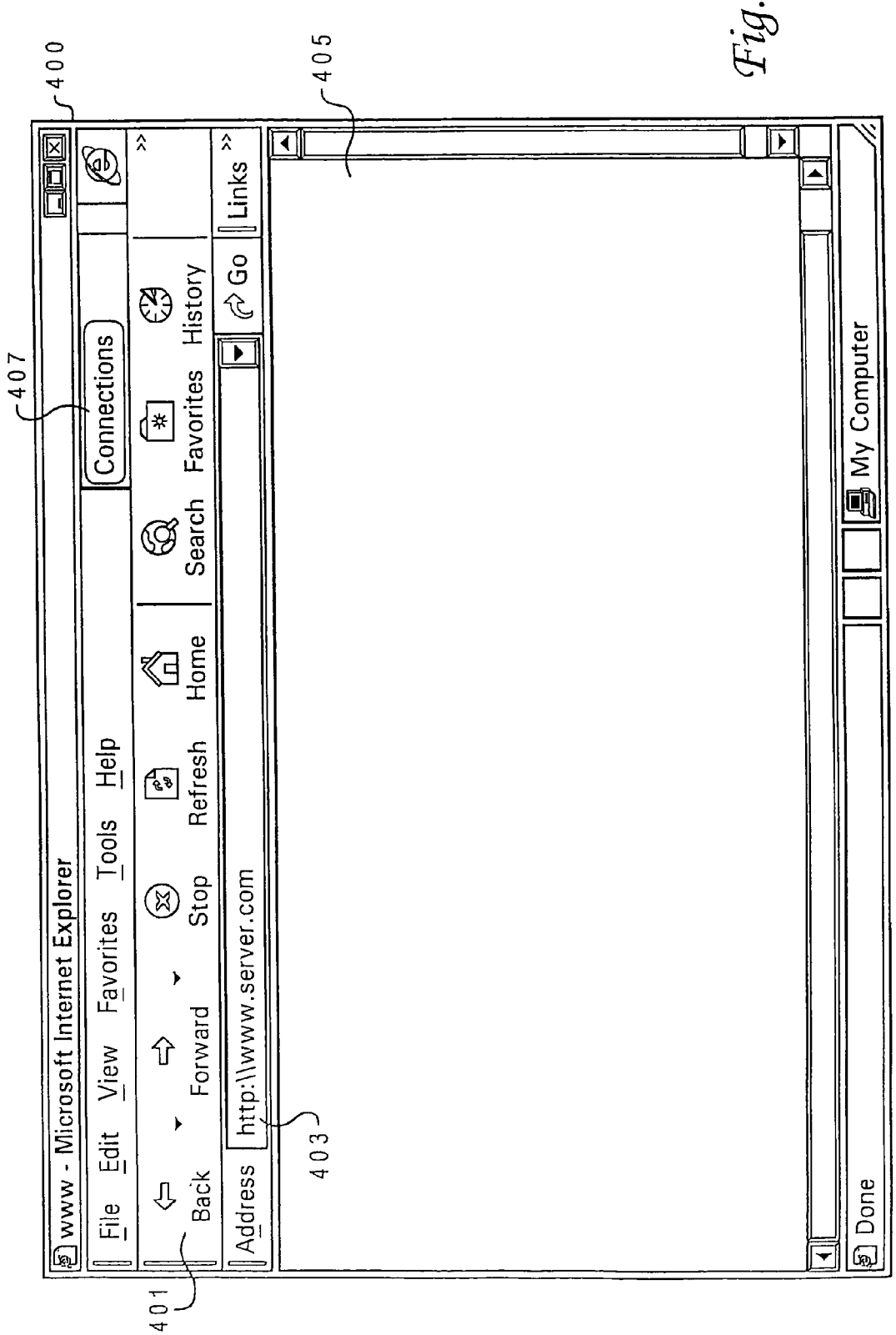
FIG. 4 is a block diagram of a modified browser application with a selectable connection button for opening a connection settings window in accordance with a preferred embodiment of the present invention.

FIG. 4 illustrates a GUI of a client browser application utilized in a preferred embodiment of the invention. Client browser 400 is the browser application running on a client, which controls connection to the network. In the preferred embodiment, client browser 400 has selection buttons 401, a search field 403, display frame 405, etc. Client browser 400 also has a "connection" button 407, which when selected by a user opens the connection settings GUI illustrated in FIG. 5A.

Figure 5A:
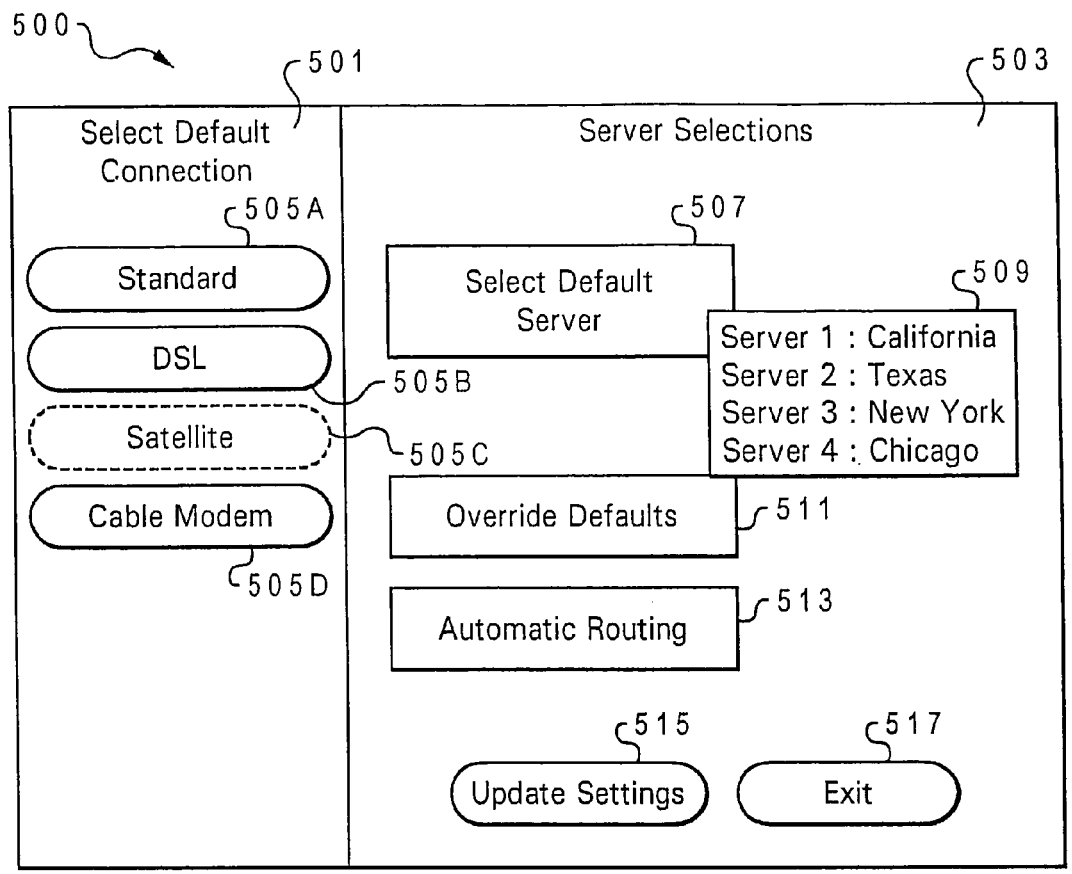
FIG. 5A is a block diagram of a server-connection's GUI utilized in accordance with a preferred embodiment of the present invention.

Referring now to FIG. 5A, there is illustrated a connection settings GUI according to a preferred embodiment of the present invention. Connection settings GUI 500 has a default selections frame 501 and a server selections frame 503. Default selections frame 501 contains a select button for each connection medium available to the client system. In the illustrative embodiment, select buttons for DSL (i.e., phone-based connection) 505A, wireless 505B, Satellite 505C, and cable modem 505D, are illustrated. The presently available connection media are represented with full lines, while the presently unavailable connection medium (i.e., satellite) is represented with dashed lines. Also, the currently selected medium is highlighted.

Server selections frame 503 allows the user to select an option for determining which connection routes to utilize during server connections. Three major routing options, presented as selectable buttons, are available. The selectable buttons of the routing options include select default server button 507, override defaults button 511 and automatic routing button 513. Selection of select default server button 507 (or override defaults button 511) causes a pop-up menu 509 of possible server connections to be displayed. A user may thus select a particular server as the default server and force all connections to be routed to that particular server. When the override defaults button 511 is selected, however, the pop-up menu 509 is utilized to select a primary server and alternate option(s) for routing the connection when the connection via the default server is bad or congested, etc. In a preferred embodiment, when an alternate server route is determined to be more optimal than the default server route, the current default route is automatically replaced within the connections settings by the alternate route. The alternate route is stored by the connection utility as the new default route for use during later connections.

Once the user has completed his selections, he may select the Update button 515, which updates the default connections and server selections prior to exiting connection settings GUI 500. The user may also select the exit button 517 which exits the GUI 517 without changing the previous settings.

Selection of automatic routing 513 enables the browser to access a stored connectivity table, illustrated in FIG. 6A, which stores specific routing information by which the optimal route for a particular connection is determined. In the preferred embodiment, selection of a best performing network route involves utilizing the connectivity table 600. The connectivity table 600 is utilized to track and store a history of network and routing parameters 601, which indicate the efficiency of a particular server or route using efficiency values ranging from, for example, 1-5. The network parameters are generated by first encoding software call-backs into the connection protocol stack and creating within the connection utility a routing function, by which these software call-backs may transmit network routing information back to the client. The functionality and utilization of software call-backs in network applications is described in detail in U.S. patent application Ser. No. 09/584,067 entitled "Extending Functionality of Network I/O APIs by Using Call-Back Mechanisms," which is filed concurrently herewith and hereby incorporated by reference. Initial parameter values may be set by default or by a user. However, all subsequent values are set utilizing the call-back functionality. The parameter values may be updated during each connection request or at some pre-determined period, for example, every 6 hours.

Figure 9:
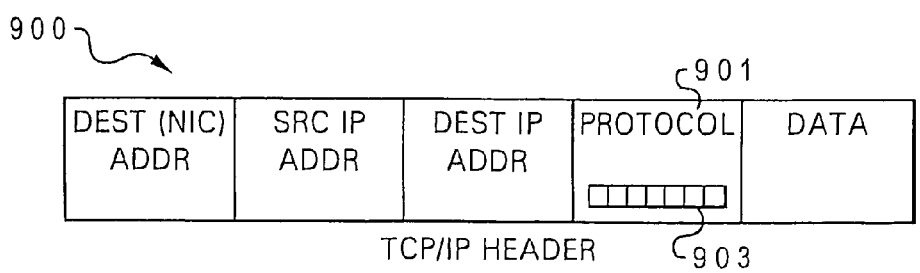
FIG. 9 is a block diagram of the TCP/IP header with an encoded call-back component for directing client call-backs in accordance with a preferred embodiment of the present invention.

FIG. 9 illustrates a Transmission Control Protocol/Internet Protocol (TCP/IP) header for an Internet connection protocol. TCP/IP header 900 contains protocol stack 901 that is utilized to route client requests via web browser. Protocol stack 901 of TCP/IP header 900 is modified to include a set of call-back registers 903, which complete the monitoring of current network connection and extracts relevant parameter data (or metrics). The set of call-back registers are programmed to return the parameter data to the client prior to termination of the network connection.

Returning now to FIG. 6A, connectivity table 600 contains a mapping of servers (or connection routes) 603 presented in columns with a list of corresponding filters (or parameters) values 601, which are utilized to determine a relative connection rating of each of servers 603. The illustrated parameters values (metrics) 601 includes location of server (i.e., with respect to the web site, since a server tends to have quicker connection speeds to a web site that is closer than one at a further distance), connecting medium bandwidth, latency, packet size, reliability, server capacity, and cost. Other parameters may be included, for example, relative security and time of day (e.g., for clients in the eastern U.S., in the early morning, servers in the western U.S. may be less congested than servers in the Eastern U.S. because of the time difference).

FIG. 6A provides a specific 2 domain embodiment. A domain is an IP address usually associated with a server on the Internet. In FIG. 6, for example, ibmgame.com domain represents a server, which hosts an interactive game that is accessed by the client browser (i.e., the user of the client browser). The server for ibmgame.com domain is accessed from the client via a particular route and the associated metrics of that route are stored within the connectivity table 600. The columns illustrate three pairs of connection parameter values. A relative rating 605 of the pairs utilized in the determination of the optimal route.

The first pair represents the user preferences for each parameter when connecting to both general domains (i.e., other domains besides the ibmgame.com domain) and when connecting to ibmgame.com domain. These settings are made with the default selection of connection settings GUI of FIG. 5A. Each parameter is assigned a value ranging from 1 to 5, with 1 representing a good (or high priority or important) metric and 5 representing a bad (or low priority or unimportant) metric. For, example, in the first column pair, latency has a relatively high priority when connecting to the ibmgame.com domain. Bandwidth, however, has a low priority.

The second column pair indicates the average metrics for each parameter when connecting to server A and server B. Accordingly, server A provides the best connection to the general domains. The third column pair illustrates the metrics for connecting to ibmgame.com domain for each server. As illustrated, server B provides relatively better connections to this domain than does server A. Thus when a user wishes to connect to a general domain, the connection utility automatically selects server A to route the connection, unless the user specifically request connection via server B. However, when the user desires to connect to ibmgame.com domain, the connection utility automatically routes the connection via server B, based on the aforementioned metrics.

Figure 6B:
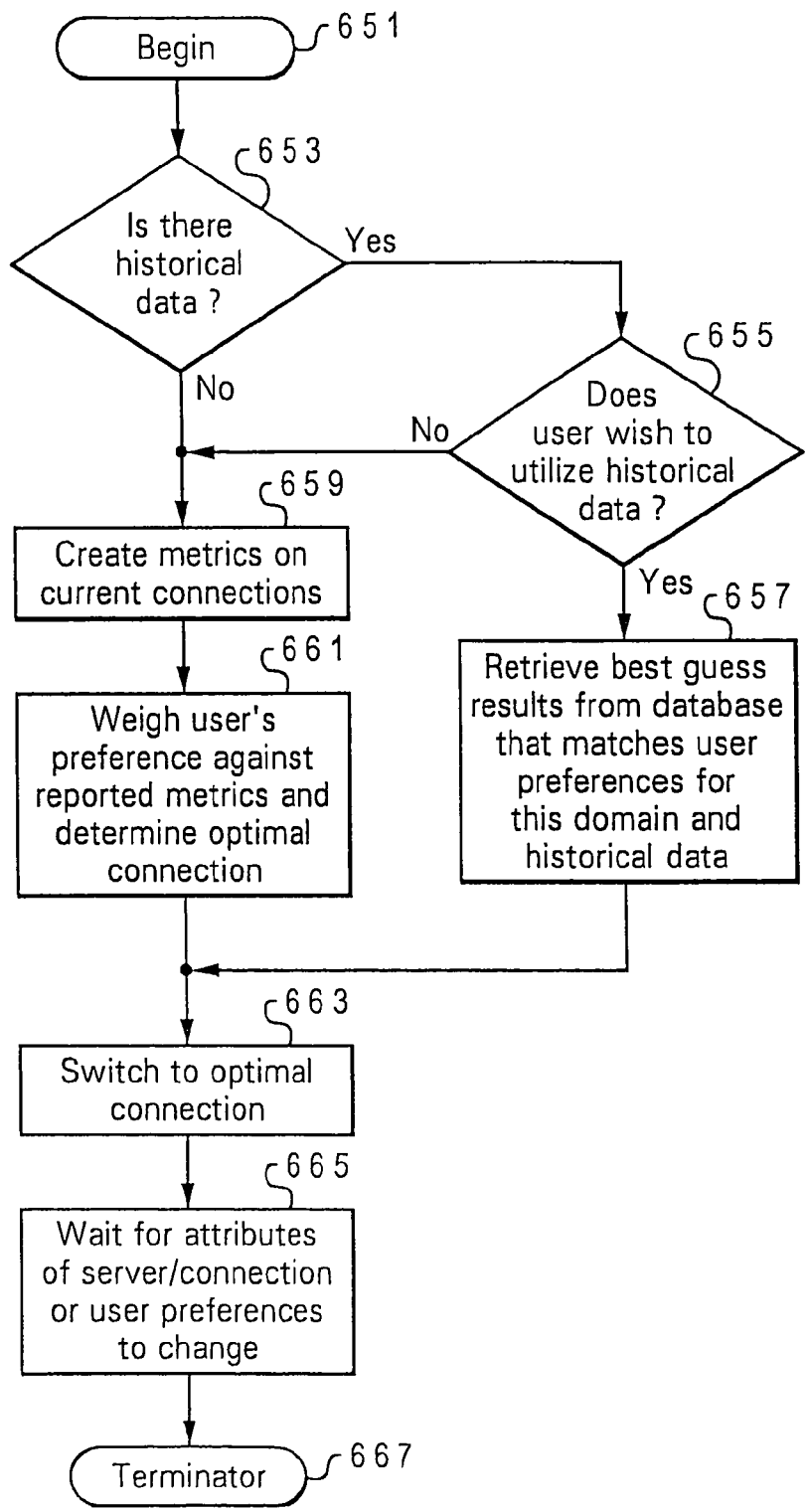
FIG. 6B is a flow chart of the process of determining a best connection route in accordance with a preferred embodiment of the present invention.

FIG. 6B illustrates one implementation of a process in which the routing information from the connectivity table of FIG. 6A is utilized. The process begins at block 651 and thereafter proceeds to block 653, where the user preferences are obtained. A determination of whether historical data on the metrics of the connection exists is then made at block 655. If there is historical data, a determination is made whether the user preferences indicate that the user desires to utilize the historical data depicted at block 657. If the user wishes to utilize the historical data, the best guess results are then computed utilizing the historical data from the database and the user preferences at block 657. The result is then used as the basis for the connection. If, however, there is no historical data or the user does not wish to utilize the historical data, new metrics are generated from the current connections at block 659. Thus, the user may decide if he wants to accept an immediate best guess, which is almost immediate and based on historical performances (i.e., the user preference plus the previously recorded metrics) or alternatively if he wishes the connection utility to complete an actual evaluation of current conditions. The later method will result in some delay, which may be noticeable based on the speed of the hardware being utilized.

Once the new metrics are generated, they are compared against the user's preferences to determine the optimal connection at block 661, and the session is routed to the optimal connection at block 663. The connection utility then monitors the connection for changes in the attributes of the server, connection, or the user preferences at block 665. A change in a metric may result in the process returning to block 651 and similar analyses being conducted until the session is terminated. The process then ends at block 667.

Since each client connects to only a limited number of servers, the actual table is held to a manageable size and updated after each connection or series of connections without utilizing a lot of the client's memory capacity. The function which computes the relative ratings of each connection type is linked to the connection utility to provide a resulting best connection route. The connection utility then automatically updates the TCP/IP header with the routing information. Thus, when a connection is requested, the connection is automatically routed to the optimal route without requiring user input.

Figure 7:
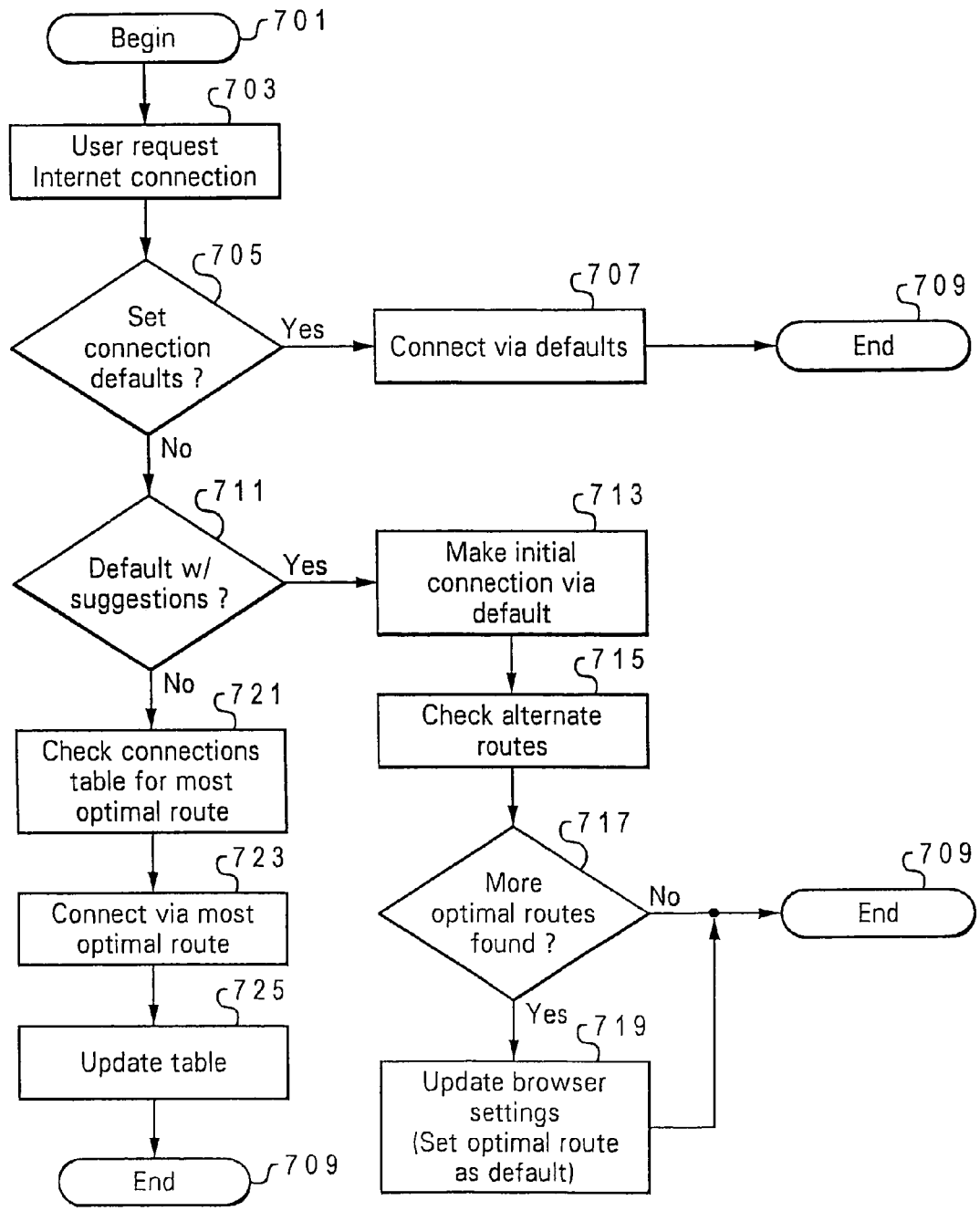
FIG. 7 is a flow chart of the process of completing a network connection in accordance with a preferred embodiment of the present invention.

Referring now to FIG. 7, there is illustrated another embodiment of the network connection process beginning at block 701 and thereafter proceeding to block 703, which depicts the user of the client requesting an Internet connection. The connection request triggers the connection utility, which determines if default server connections were set at block 705. If default server connections were set, then the connection request is routed via the default server at block 707, and the process ends at block 709. If, however, a default server connection was not set, the connection utility next determines if an override default (i.e., default with suggestions) option was set at block 711. If an override default option was set, the current default connection is completed at block 713. Simultaneously, alternate routes are checked at block 715 to enable the connection utility to determine if a more optimal route is available at block 717. If there is a more optimal route, the browser's connection settings are updated to reflect the optimal route as the default route at block 719. Then the process ends at block 709.

Returning to block 711, if default with suggestions option was not set, then the connection utility checks the connectivity table for the optimal route at block 721. The connection is completed via the optimal route at block 723. An update of connection status is made within the connectivity table at block 725, and then the process ends at block 709.

Seamless Switching of a Session Connection

In another preferred embodiment of the invention, a single client browser is permitted to access the Internet via more than one network connection routes during a single network session. A session may consist of the transfer of multiple data types, each of which has a corresponding optimal route for transmission. The word "data" as utilized herein is defined to mean any type of information which may be transmitted over a network connection during a session. The optimal routes may be determined by factors such as the connection medium, associated cost, and level of security, as described with reference to FIG. 6A. For example, a financial session which includes confidential or time sensitive financial information and general customer data may have the financial information routed via a first route and the customer data routed via another route. This embodiment assumes seamless switching capability during a session and utilizes clients that are capable of simultaneously connecting to a network via multiple connection routes. The preferred embodiment applies to situations in which a connection is lost during a session and a new connection has to be made to complete the session.

Figure 10:
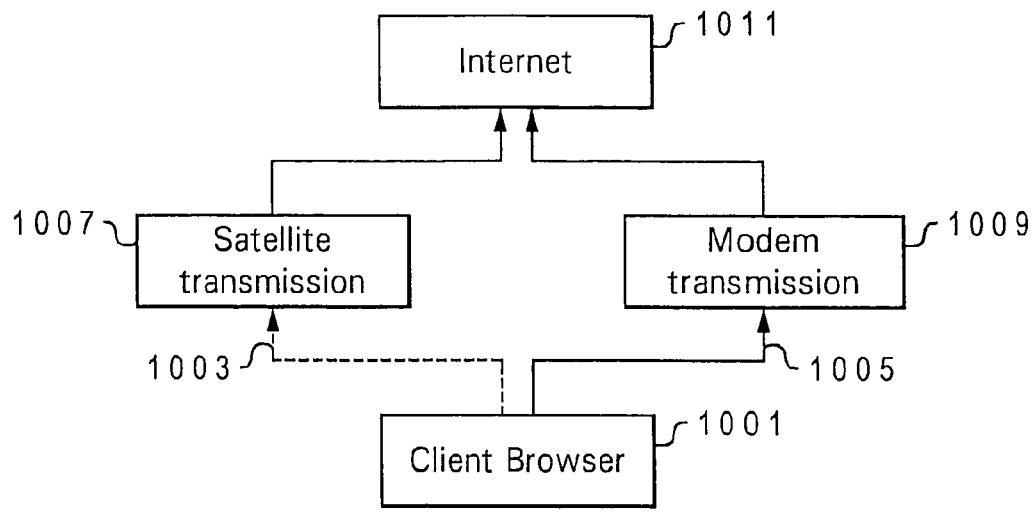
FIGS. 10 and 11 are block diagrams of specific examples of a client connected to a network via two possible routes to enable the switching of a session from one connection route to another in accordance with another preferred embodiment of the present invention.

According to this embodiment and as illustrated in FIG. 10, client browser 1001 may be simultaneously connected to a network (e.g., the Internet) via a first route 1003 and a second route 1005. First route 1003 connects client browser 1001 to Internet 1011 via a satellite 1007 (for example, a DirectPC connection), which has high bandwidth for transfer of large files but exhibits high latency. Second route 1005 connects client browser 1001 to Internet 1011 via a phone and modem connection 1009, which typically has low bandwidth for transfer of large files but exhibits low latency. During the session, transfer of data, such as customer data, which is not time sensitive (i.e., does not require low latency) but requires large bandwidth is completed via first route 1003. The transfer of time sensitive financial data, which requires less bandwidth is completed via the second route 1005. During operation, connection utility of client browser 1001 monitors the transmissions within a session to detect the data type, and controls the routing of the data via its optimal route. In one embodiment, the optimal route for the various definable data types are determined and stored in the connectivity table or other location which is accessible by the connection utility. During connection, the connection utility monitors the network session for the occurrence of specific pre-defined characteristics, which are exhibited by particular pre-defined data types and for which network performance may be enhanced by routing the data types via a different route. Alternatively, the user may be permitted to set default routes based on data types prior to commencement of the session. Thus, although all the data is transferred to the same destination during a single session, each data type may be routed along different connection paths.

In another embodiment, in which only a single route maybe connected at a given time during a session, a first portion of the session is routed via a first connection route. Whenever a measurable change occurs in the connection route, based on predefined criteria, the client dynamically routes that new data type via a next connection route. For example, if the connection is lost during a session or the connection becomes congested or too slow, a next route is automatically selected for completing the session. Selection of an alternate route may occur prior to connecting the session. The connection utility is provided with the set of criteria and the alternate routes. This information is made accessible to the connection utility. During session connection, the connection utility monitors the network session for the occurrence of the specific pre-defined characteristics, which triggers the routing of the session via a different network route.

Figure 8:
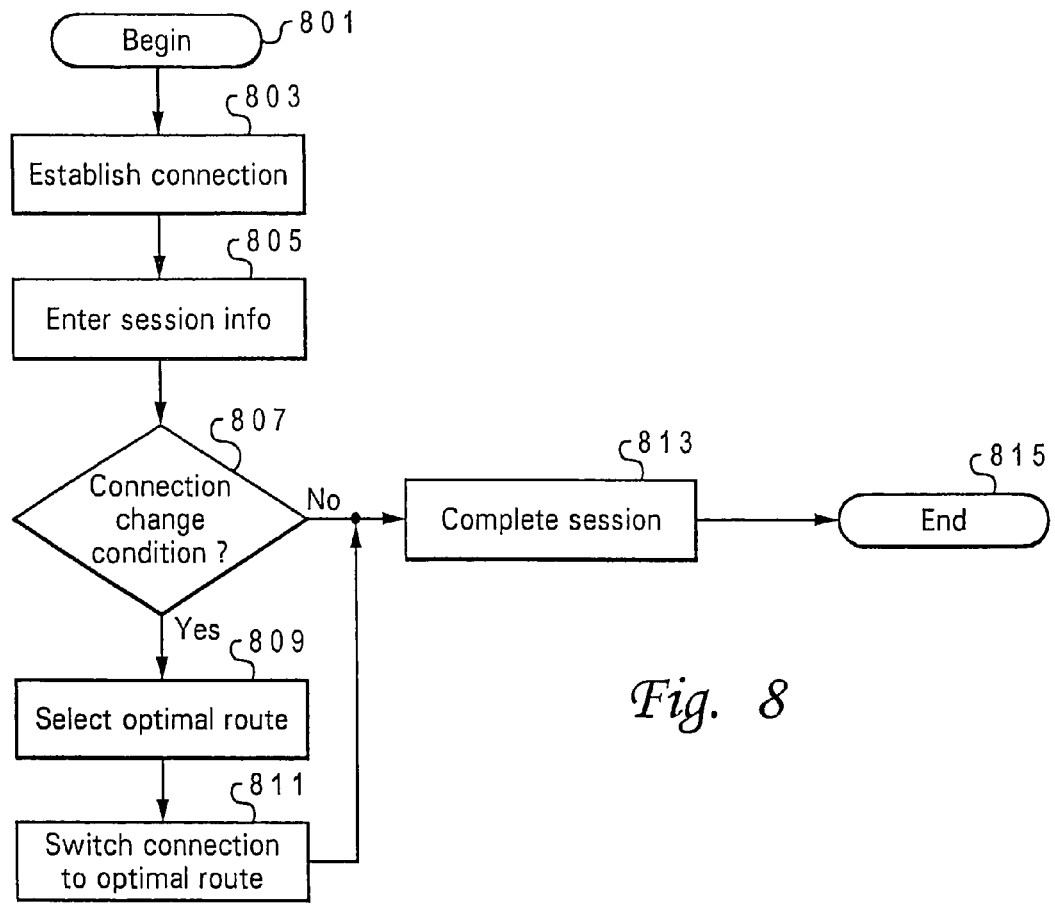
FIG. 8 is a flow chart of the process of switching a session from one connection route to another in accordance with another preferred embodiment of the present invention.

FIG. 8 illustrates the process of switching connection routes during a session in accordance with one preferred implementation of the invention. The process begins at block 801 and thereafter proceeds to block 803, where a connection route is established. Session information is entered by a user at block 805. During a session, the connection utility determines if a particular condition that warrants the change of the present connection route to another connection route has occurred at block 807. The conditions which may trigger this response includes a determination of (1) a more optimal connection route (where the route is significantly more optimal relative to the present route), (2) a bad connection on a present route, (3) a loss of connection on a present route, whether due to server failure of connection medium failure, change in data type, etc. In the illustrated embodiment, the optimal route is selected at block 809 and the session switched to the optimal route at block 811. The session is then completed at block 813 on the connected route, and the process ends at block 815.

In the preferred embodiment, the switching step occurs without any significant loss of information from the session. Thus, in one embodiment, session information (i.e., client entered keystrokes and other events) is cached on the client system until the session is terminated by the user. If the session connection is lost or another condition occurs, the connection utility merely reconnects via a different route where the cached session identification (ID) and server key information is sent to the server through the new connection. The client session data is reused by the client. The server reloads its saved session data using the old session ID and client key for stored lookup. The server sends its client key and previous session ID to the client machine for verification. Once the client and server are working with the new session connection using the stored session data, the user is now able to continue the session from the point at which the previous session was interrupted. With faster connection media, such as cable modem, the switching and re-connection of a session may occur quickly enough to not interrupt the user interfacing with the server. This is referred to as seamless switching of session connection routes.

Figure 5B:
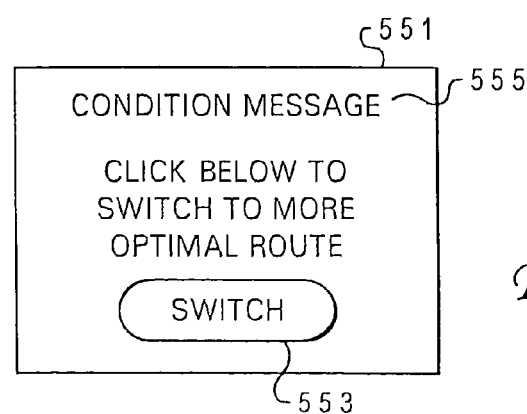
FIG. 5B is a block diagram of an in-session connection modification window utilized in accordance with a preferred embodiment of the present invention.

In a related embodiment, a session may be automatically re-routed to the second route only during later connection requests (i.e., the browser default is updated to select the second route). Alternatively, a "switch connection" button can be included in client browser for switching between connection states during a session. Or, in yet another embodiment, illustrated in FIG. 5B, a pop-up window 551 is initiated whenever connection utility finds a connection route which is more optimal than the present route. The user may then elect to connect via the more optimal route by selecting a "switch" button 553 within the pop-up window.

Figure 11:
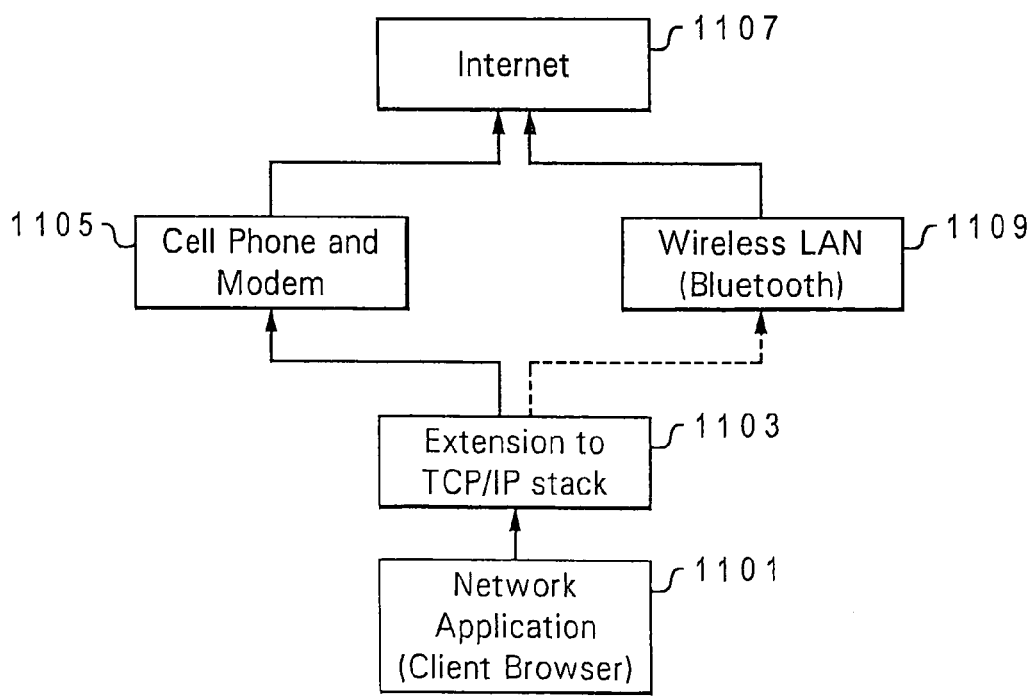

FIG. 11 illustrates a network environment in which a client session is re-routed. The network environment includes a mobile client browser 1101, such as a browser on a laptop, hand-held personal computer or mobile telephone, which is connected to the network via a wireless connection. Client browser (or network application) 1101 has TCP/IP stack extensions 1003, which determine the route for connecting the client during a session. A session, comprising network packets, may initially be routed to the Internet 1007 via a wireless LAN 1109 (e.g., bluetooth), which allows wireless transmissions for significant distances. When the client moves out of range of the wireless LAN 1109, the session is dynamically switched over to a cell phone and modem connection 1105. Dynamic switching allows the session to be continued without any significant delay or loss in session information.

Some of the benefits and applicability of the present invention includes:
1. providing dynamic assignment of proxies, name servers, etc., according to predetermined (but programmable) performance criteria embedded in the client browser;
2. enabling a user to define multiple IP addresses for proxy or name servers rather than being restricted to a single address and related server as is currently available;
3. allowing a client browser to scan each of the entered IP addresses for the one that gives the best performance for a particular target destination;
4. allowing a client browser to skip to an alternative IP address if the current server connection is terminated or is slow to respond;
5. allowing a client browser to use more than one data path per session;
6. allowing optimum performance of the client browser, which can now interface utilizing an API architecture with a network via a back-end server of a load balancing system;
7. allowing enhanced performance by reducing the number of segments traversed between a client browser and a target server by selection of the most direct path, when that path is most optimal;
8. supporting concurrent Cable Modem, Modem, T(1-N), INTERNET2, and other connection capabilities to enable multiple open proxies and other server connections;
9. providing a user friendly interface for the above features; and
10. providing performance enhancements not limited to network connected client browsers, but configurable for any client as well as server workstations.

As a final matter, it is important that while an illustrative embodiment of the present invention has been, and will continue to be, described in the context of a fully functional data processing system, those skilled in the art will appreciate that the software aspects of an illustrative embodiment of the present invention are capable of being distributed as a program product in a variety of forms, and that an illustrative embodiment of the present invention applies equally regardless of the particular type of signal bearing media used to actually carry out the distribution. Examples of signal bearing media include recordable type media such as floppy disks, hard disk drives, CD ROMs, and transmission type media such as digital and analog communication links.

Although the invention has been described with reference to specific embodiments, this description is not meant to be construed in a limiting sense. Various modifications of the disclosed embodiments, as well as alternative embodiments of the invention, will become apparent to persons skilled in the art upon reference to the description of the invention. It is therefore contemplated that such modifications can be made without departing from the spirit or scope of the present invention as defined in the appended claims.

What is claimed is:

1. A method for providing optimal connection between a client and a network, said method comprising:
providing multiple connection routes between said client and said network during a single diversified session having multiple different portions of data with each portion having a different type of data, wherein the single diversified session has multiple different types of data;
determining an effective connection route for each of said portion of said diversified session, wherein said determining further includes dynamically monitoring a network session for the occurrence of specific pre-defined characteristics exhibited by particular data types, wherein each particular data type has an effective connection route for achieving efficient network performance, and wherein the pre-defined characteristic is not a size of data;
displaying a user interface, wherein the displayed user interface contains a plurality of effective connection routes over which to transmit a type of data, and wherein the effective routes are determined based on one or more criteria selected from among wired connection, wireless connection, level of security, and transfer protocol, wherein each criteria is determined independent of cost;
prompting for a selection within the user interface of said effective connection route for one or more of the particular data types, and a different effective connection route for a second one of the particular data types;
routing a first portion of the multiple different portions of said diversified session via a first connection route, wherein a first type of data is routed via a first effective connection route; and
in response to receiving a selected effective connection route, dynamically routing a next portion of the multiple different portions of said diversified session via a next connection route that is different from the first connection route in response to a change in a connection requirement of said diversified session, based on different functional characteristics of a type of data within the next portion of the diversified session relative to the type of data within the first portion, wherein each of the multiple different portions of said single diversified session has a corresponding effective route among the multiple connection routes, such that the first connection route is an effective route for the first type of data within the portion of the diversified session and said next connection route is an effective route for said second type of data within the next portion of said diversified session, wherein each particular data type is transmitted via an effective connection route corresponding to the particular data type, and wherein the different types of data transmitted on different effective routes are re-associated at a destination to recreate the single diversified session.

* * * * *